US012633849B2

(12) United States Patent
Xu

(10) Patent No.: US 12,633,849 B2
(45) Date of Patent: May 19, 2026

(54) POWER TOOL

(71) Applicant: Nanjing Chervon Industry Co., Ltd., Nanjing (CN)

(72) Inventor: Zhen Xu, Nanjing (CN)

(73) Assignee: Nanjing Chervon Industry Co., Ltd., Nanjing (CN)

( * ) Notice: Subject to any disclaimer, the term of this patent is extended or adjusted under 35 U.S.C. 154(b) by 327 days.

(21) Appl. No.: 18/347,797

(22) Filed: Jul. 6, 2023

(65) Prior Publication Data

US 2024/0066663 A1 Feb. 29, 2024

(30) Foreign Application Priority Data

Aug. 26, 2022 (CN) .......................... 202211038573.4

(51) Int. Cl.
| | |
|---|---|
| *H02P 27/08* | (2006.01) |
| *B24B 47/12* | (2006.01) |
| *H02P 6/06* | (2006.01) |
| *H02P 6/08* | (2016.01) |
| *H02P 6/15* | (2016.01) |
| *H02P 6/182* | (2016.01) |
| *H02P 23/14* | (2006.01) |
| *H02P 25/03* | (2016.01) |

(52) U.S. Cl.
CPC ................ *H02P 6/06* (2013.01); *B24B 47/12* (2013.01); *H02P 6/085* (2013.01); *H02P 6/157* (2016.02); *H02P 6/182* (2013.01); *H02P 27/085* (2013.01)

(58) Field of Classification Search
CPC ........ B24B 47/12; H02P 25/03; H02P 27/085; H02P 6/06; H02P 6/085; H02P 6/157; H02P 6/182
See application file for complete search history.

(56) References Cited

U.S. PATENT DOCUMENTS

| | | | | | |
|---|---|---|---|---|---|
| 6,025,683 | A | * | 2/2000 | Philipp | ................. H02P 7/2913 318/257 |
| 6,229,278 | B1 | * | 5/2001 | Garces | .................... H02P 29/02 318/801 |
| 2015/0188463 | A1 | | 7/2015 | Soh | |
| 2017/0008159 | A1 | * | 1/2017 | Boeck | .................... G05B 19/00 |

(Continued)

FOREIGN PATENT DOCUMENTS

| | | |
|---|---|---|
| CN | 103077596 B | 8/2015 |
| CN | 109987185 A | 7/2019 |

(Continued)

*Primary Examiner* — Thai T Dinh
(74) *Attorney, Agent, or Firm* — Greenberg Traurig, LLP

(57) ABSTRACT

A power tool includes an electric motor including multi-phase windings; and a control circuit for controlling the electric motor to rotate. The control circuit includes a driver circuit including multiple switching elements having multiple driving states to drive the electric motor to rotate; a parameter detection module for detecting an electrical parameter of the control circuit; and a controller for outputting a pulse-width modulation (PWM) control signal to control the driver circuit to change the multiple driving states. The controller is configured to change the absolute value of the variation of a duty cycle of the PWM control signal according to the electrical parameter to control a steady-state error of the electric motor running in a constant speed to be within a preset range.

18 Claims, 4 Drawing Sheets

(56)                    References Cited

U.S. PATENT DOCUMENTS

| 2019/0013750 | A1  | 1/2019 | Leman |         |
|--------------|-----|--------|-------|---------|
| 2021/0187635 | A1* | 6/2021 | Lu ............................ | B25F 5/02 |
| 2021/0211082 | A1  | 7/2021 | Leman |         |
| 2022/0123685 | A1* | 4/2022 | Yang ........................ | H02P 6/15 |
| 2022/0130153 | A1* | 4/2022 | Wang ................... | B60W 40/04 |
| 2022/0247270 | A1* | 8/2022 | Jefferies ................ | H02K 11/33 |
| 2022/0281067 | A1* | 9/2022 | Sugita .................... | B24B 23/02 |

FOREIGN PATENT DOCUMENTS

| CN | 211992482 U | 11/2020 |
| CN | 214186465 U |  9/2021 |
| CN | 113044079 A | 10/2021 |
| CN | 111787556 A |  3/2024 |

* cited by examiner

Detect the bus voltage of a control circuit    S101

Set the amplitude of the variation of the PWM duty cycle according to the relationship between the bus voltage and the absolute value of the variation of the PWM duty cycle    S102

POWER TOOL

CROSS REFERENCE TO RELATED APPLICATION

This application claims priority to Chinese Patent Application No. 202211038573.4 filed on Aug. 26, 2022, the disclosures of which is incorporated herein by reference in its entirety.

BACKGROUND

At present, high-voltage brushless power tools for engineering or household use have a relatively high maintenance rate and a relatively short maintenance cycle. For example, a risk that an electronic control board of a wall grinding machine basically fails within a month or two or may fail within a week at the shortest exists.

SUMMARY

A power tool includes an electric motor including multiphase windings; and a control circuit for controlling the electric motor to rotate. The control circuit includes a driver circuit including multiple switching elements having multiple driving states to drive the electric motor to rotate; a parameter detection module for detecting an electrical parameter of the control circuit; and a controller for outputting a pulse-width modulation (PWM) control signal to control the driver circuit to change the multiple driving states. The controller is configured to change the absolute value of the variation of a duty cycle of the PWM control signal according to the electrical parameter to control a steady-state error of the electric motor running in a constant speed to be within a preset range.

In an example, the electrical parameter includes a bus voltage of the control circuit.

In an example, the output power of the power tool is greater than or equal to 400 W.

In an example, the average inductance of each phase winding is greater than or equal to 0.9 mH.

In an example, the electric motor is a sensorless electric motor.

In an example, the control circuit further includes a filter capacitor, where the capacitance of the filter capacitor is less than or equal to 20 μF.

In an example, the electrical parameter has a linear or non-linear relationship with the absolute value of the variation of the duty cycle.

In an example, the electrical parameter is inversely proportional to the absolute value of the variation of the duty cycle.

In an example, the electric motor is a brushless direct current (BLDC) motor.

In an example, the power tool could be one of a wall grinding machine, an electric hammer, an angle grinder, or an electric wrench.

In an example, the power tool could be a wall grinding machine comprising a tool body, where the tool body includes a working head, an operating rod, the electric motor mounted in the working head, and a control device accommodating the controller.

In an example, the control device disposed in the tool body or independent of the tool body.

In an example, the average inductance of the windings of the electric motor is greater than or equal to 1.1 mH.

In an example, the steady-state error of the electric motor running in a constant speed is less than or equal to 1.5%.

A power tool includes an electric motor including multiphase windings; and a control circuit for controlling the electric motor to rotate. The control circuit includes a driver circuit including multiple switching elements having multiple driving states to drive the electric motor to rotate; a parameter detection module for detecting an electrical parameter of the control circuit; and a controller for outputting a PWM control signal to control the driver circuit to change the multiple driving states. The controller is configured to change the amplitude of the variation of a duty cycle of the PWM control signal according to the electrical parameter to control the phase current magnitude when the electric motor commutates to be less than 70 A.

In an example, the electrical parameter is inversely proportional to the absolute value of the variation of the duty cycle.

In an example, the electrical parameter comprises a bus voltage of the control circuit.

In an example, output power of the power tool is greater than or equal to 400 W.

In an example, average inductance of each phase winding is greater than or equal to 0.9 mH.

In an example, the electric motor is a sensorless electric motor.

DETAILED DESCRIPTION

Figure 1:
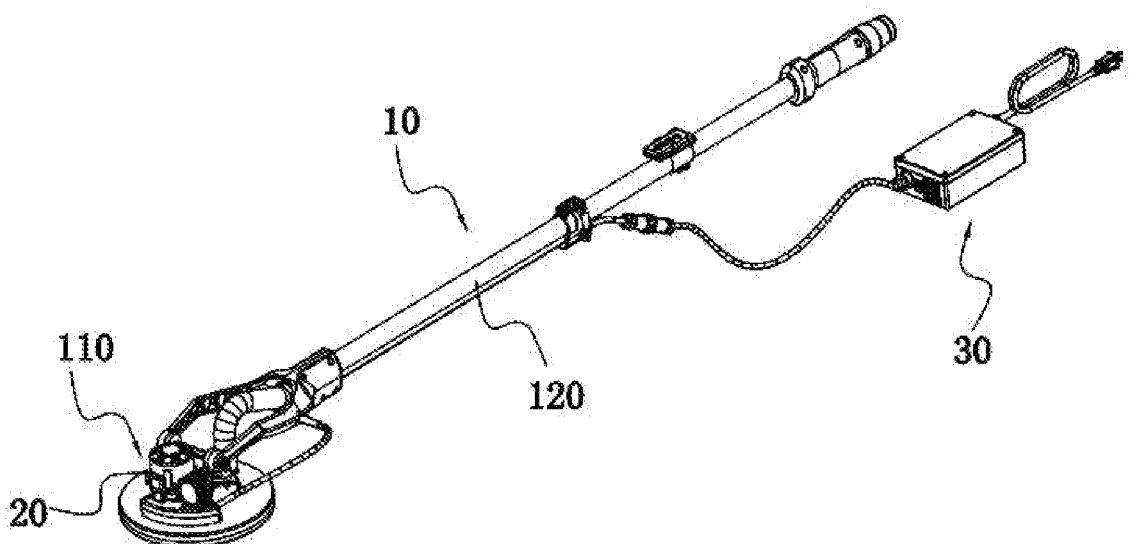
FIG. 1 is a structural view of a power tool according to an example of the present application.

Before any examples of this application are explained in detail, it is to be understood that this application is not limited to its application to the structural details and the arrangement of components set forth in the following description or illustrated in the above drawings.

In this application, the terms "comprising", "including", "having" or any other variation thereof are intended to cover an inclusive inclusion such that a process, method, article or device comprising a series of elements includes not only those series of elements, but also other elements not expressly listed, or elements inherent in the process, method, article, or device. Without further limitations, an element defined by the phrase "comprising a . . . " does not preclude the presence of additional identical elements in the process, method, article, or device comprising that element.

In this application, the term "and/or" is a kind of association relationship describing the relationship between associated objects, which means that there can be three kinds of relationships. For example, A and/or B can indicate that A exists alone, A and B exist simultaneously, and B exists alone. In addition, the character "/" in this application generally indicates that the contextual associated objects belong to an "and/or" relationship.

In this application, the terms "connection", "combination", "coupling" and "installation" may be direct connection, combination, coupling or installation, and may also be indirect connection, combination, coupling or installation. Among them, for example, direct connection means that two members or assemblies are connected together without intermediaries, and indirect connection means that two members or assemblies are respectively connected with at least one intermediate members and the two members or assemblies are connected by the at least one intermediate members. In addition, "connection" and "coupling" are not limited to physical or mechanical connections or couplings, and may include electrical connections or couplings.

In this application, it is to be understood by those skilled in the art that a relative term (such as "about", "approximately", and "substantially") used in conjunction with quantity or condition includes a stated value and has a meaning dictated by the context. For example, the relative term includes at least a degree of error associated with the measurement of a particular value, a tolerance caused by manufacturing, assembly, and use associated with the particular value, and the like. Such relative term should also be considered as disclosing the range defined by the absolute values of the two endpoints. The relative term may refer to plus or minus of a certain percentage (such as 1%, 5%, 10%, or more) of an indicated value. A value that did not use the relative term should also be disclosed as a particular value with a tolerance. In addition, "substantially" when expressing a relative angular position relationship (for example, substantially parallel, substantially perpendicular), may refer to adding or subtracting a certain degree (such as 1 degree, 5 degrees, 10 degrees or more) to the indicated angle.

In this application, those skilled in the art will understand that a function performed by an assembly may be performed by one assembly, multiple assemblies, one member, or multiple members. Likewise, a function performed by a member may be performed by one member, an assembly, or a combination of members.

In this application, the terms "up", "down", "left", "right", "front", and "rear" "and other directional words are described based on the orientation or positional relationship shown in the drawings, and should not be understood as limitations to the examples of this application. In addition, in this context, it also needs to be understood that when it is mentioned that an element is connected "above" or "under" another element, it can not only be directly connected "above" or "under" the other element, but can also be indirectly connected "above" or "under" the other element through an intermediate element. It should also be understood that orientation words such as upper side, lower side, left side, right side, front side, and rear side do not only represent perfect orientations, but can also be understood as lateral orientations. For example, lower side may include directly below, bottom left, bottom right, front bottom, and rear bottom.

In this application, the terms "controller", "processor", "central processor", "CPU" and "MCU" are interchangeable. Where a unit "controller", "processor", "central processing", "CPU", or "MCU" is used to perform a specific function, the specific function may be implemented by a single aforementioned unit or a plurality of the aforementioned unit.

In this application, the term "device", "module" or "unit" may be implemented in the form of hardware or software to achieve specific functions.

In this application, the terms "computing", "judging", "controlling", "determining", "recognizing" and the like refer to the operations and processes of a computer system or similar electronic computing device (e.g., controller, processor, etc.). Power tools to which the technical solutions of the present application are applicable include various high-voltage brushless power tools, such as a wall grinding machine, an electric hammer, an angle grinder, and an electric wrench. Any other power tools that use brushless motors and can perform high-power operations or that can adopt the solutions provided in the examples of the present application are within the scope of the present application.

In the examples of the present application, the wall grinding machine is used as an example for description. As shown in FIG. 1, a wall grinding machine 100 may include a tool body 10, where the tool body 10 includes a working head 110, an operating rod 120, an electric motor 20 mounted in the working head 110, and a control device 30 disposed in the tool body 10 or independent of the tool body 10. A functional piece is further provided on the working head 110, such as a grinding disc.

In an example, the electric motor 20 is a brushless direct current (BLDC) motor. In an example, the electric motor 20 is a sensorless BLDC motor. In an example, the electric motor 20 is a sensored BLDC motor. In the present application, the BLDC motor may be an inrunner or an outrunner, and the electric motor 20 includes at least three-phase stator windings A, B, and C in a star connection or a triangular connection. The control device 30 can control the electric motor 20 to rotate so that the electric motor 20 can drive the grinding disc to perform the grinding work.

Figure 2:
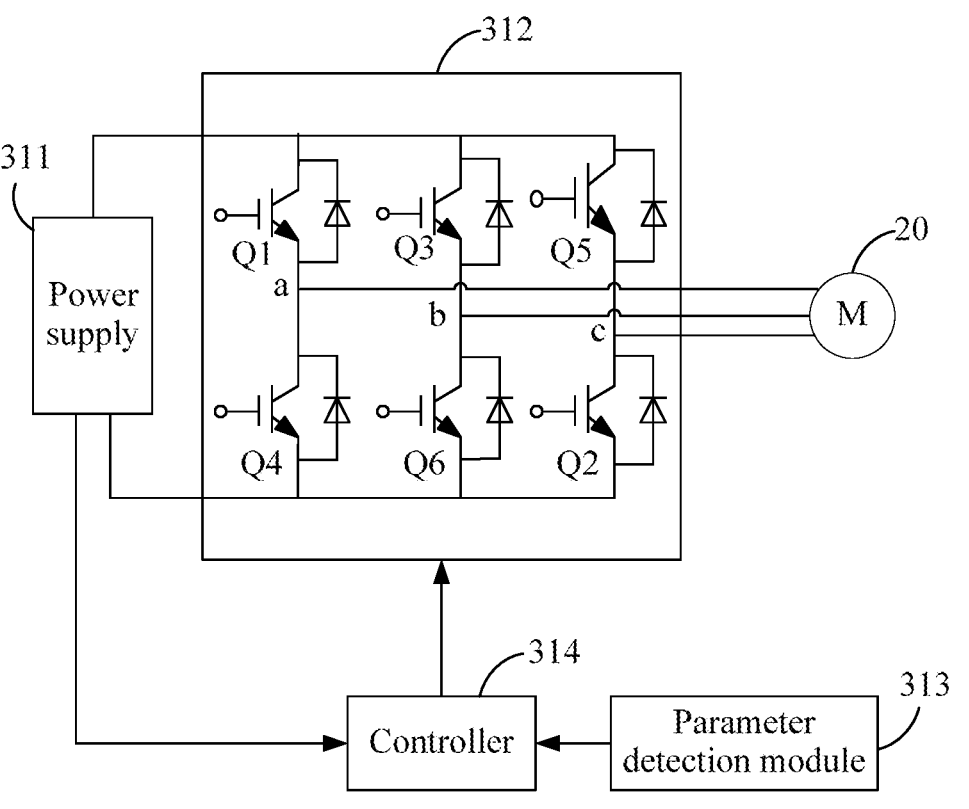
FIG. 2 is a circuit block diagram of a power tool according to an example of the present application.

In an example, as shown in FIG. 2, the control device 30 may include a control circuit 31, where the control circuit 31 includes a power supply 311, a driver circuit 312, a parameter detection module 313, and a controller 314. The driver circuit 312 is electrically connected to the electric motor 20 and can drive the electric motor 20 to rotate. The power supply 311 may optionally be a battery pack. The battery pack may be composed of a group of battery cells. For example, the battery cells may be connected in series into a single power supply branch to form a 1P battery pack. The output voltage of the battery pack is changed by a specific power supply conversion module, such as a direct current-direct current (DC-DC) module, such that a power supply voltage suitable for the driver circuit 312, the electric motor 20, and the like is outputted to power them up. It is to be understood by those skilled in the art that the DC-DC module is a mature circuit structure and may be selected accordingly depending on the specific parameter requirements of the power tool.

In an example, the driver circuit 312 is electrically connected to the stator windings A, B, and C of the electric motor 20 and used for transmitting the current from the power supply 311 to the stator windings A, B, and C to drive the electric motor 10 to rotate. In an example, the driver circuit 312 includes multiple switching elements Q1, Q2, Q3, Q4, Q5, and Q6. A gate terminal of each switching element is electrically connected to the controller 314 and used for receiving a control signal from the controller 314. A drain or source of each switching element is connected to the stator windings A, B, and C of the electric motor 20. The switching elements Q1 to Q6 receive control signals from the controller 314 to change respective conduction states, thereby changing the current loaded to the stator windings A, B, and C of the electric motor 20 by the power supply 311. In an example, the driver circuit 312 may be a three-phase bridge driver circuit including six controllable semiconductor power devices (such as field-effect transistors (FETs), bipolar junction transistors (BJTs), or insulated-gate bipolar transistors (IGBTs)). It is to be understood that the preceding switching elements may be any other types of solid-state switches, such as the IGBTs or the BJTs.

The parameter detection module 313 can detect an electrical parameter of the control circuit 31. For example, the parameter detection module 313 can detect the bus voltage or bus current of the control circuit 31 or can detect the phase current or phase voltage of the electric motor 20. In an example, the parameter detection module 313 may include one detection element having a function of detecting multiple parameters or may include multiple detection elements that respectively detect different electrical parameters. The parameter detection module 313 is electrically connected to the controller 314 and can transmit the electrical parameter to the controller 314. Other electrical connections of the parameter detection module 313 in the control circuit 31 are not limited in this example.

To drive the electric motor 20 to rotate, the driver circuit 312 has multiple driving states. The electric motor 20 may have different rotational speeds or different rotational directions in different driving states. In the present application, the process is not described in detail where the controller 314 controls the driver circuit 312 to change different driving states such that the electric motor 20 has different rotational speeds or different rotational directions.

Figure 3:
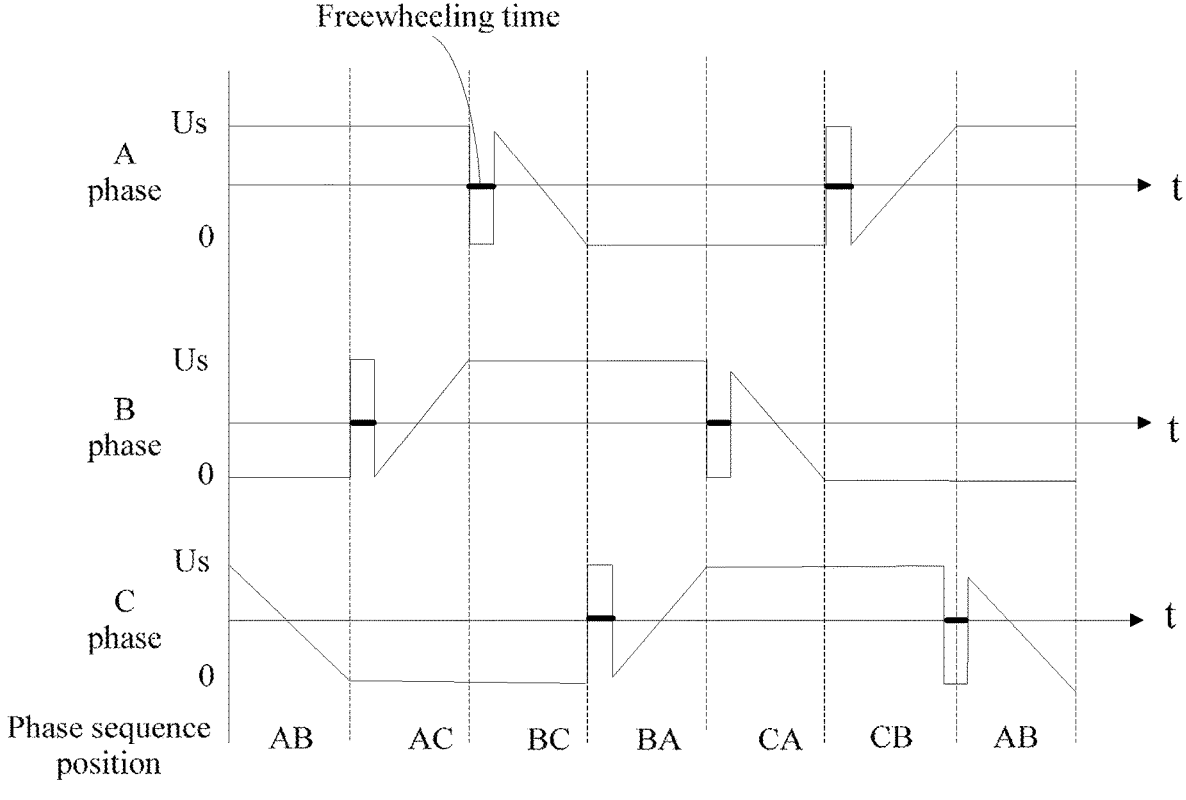
FIG. 3 is a schematic diagram of the commutation of a conduction cycle of motor windings according to an example of the present application.

In an example, the driver circuit 312 typically has at least six driving states, and each switching of the driving state corresponds to one commutation action of the motor windings. As shown in FIG. 3, when the electric motor 20 commutates each time, the phase voltage of a floating phase changes suddenly, and the voltage value after the sudden change is maintained for a period of time before the voltage value is eliminated. This period of time may be understood as the freewheeling time of the floating-phase winding when the electric motor commutates. It is to be understood that the higher the voltage of the motor windings, the longer the freewheeling time. However, the power of the electric motor 20 used in the high-voltage brushless power tool is generally relatively large, and the average inductance of the windings of the electric motor 20 is relatively high so that the voltage of the windings is relatively high, and the freewheeling time during commutation is also relatively long. In an example, the average inductance of the windings of the electric motor 20 is greater than or equal to 0.9 mH. In an example, the average inductance of the windings of the electric motor 20 is greater than or equal to 1.1 mH. In an example, the average inductance of the windings of the electric motor 20 is greater than or equal to 1.3 mH. For example, the average inductance may be 1 mH, 1.2 mH, 1.5 mH, 1.8 mH, 2 mH, or the like. In an example, the output power of the electric motor 20 is greater than or equal to 400 W, such as 450 W, 500 W, or 550 W.

In an example, the control circuit 31 further includes a filter capacitor, where the capacitance of the filter capacitor is less than or equal to 20 μF. For example, the capacitance of the filter capacitor could be 10 μF or 15 μF.

Generally, the motor control of the sensorless motor requires the accurate detection of a zero-crossing during the commutation process of the electric motor, so as to accurately estimate the rotor position of the electric motor. The zero-crossing may be understood as the moment when the floating-phase voltage is zero during the commutation process of the electric motor. If the inductance of the motor windings is relatively high and the freewheeling time of the commutation process of the electric motor is relatively long, an effective zero-crossing cannot be detected, resulting in a commutation error. The motor commutation error causes electrical spikes in the control circuit 31, such as voltage spikes, current spikes, or energy spikes. The spikes may be understood as fast and short-duration electrical transients of the voltage (voltage spikes), current (current spikes), or delivered energy (energy spikes) in the control circuit. The electrical spikes in the control circuit 31 easily cause damage to the power components in the circuit or cause the risk of demagnetization of the electric motor.

To maintain the constant-speed stability of the electric motor, that is, to decrease the steady-state error of the electric motor running in a constant speed, the controller 313 can change the duty cycle of the PWM control signal to control the electric motor to operate at a constant speed. In fact, the controller 313 can adjust the duty cycle of the PWM signal in time according to the rotational speed information fed back by the electric motor 20 to implement the stable constant-speed control. In the process of the controller 313 adjusting the duty cycle of the PWM signal, a relatively large variation of the duty cycle may occur, resulting in problems such as more energy storage in the motor windings, relatively long freewheeling time during commutation, and the electrical spikes; or a small variation of the duty cycle may occur during regulation and control, resulting in the unobvious change of the rotational speed and increasing the steady-state error of the constant-speed control.

To solve the preceding problems, the control circuit 31 in this example can limit the variation of the PWM duty cycle of the speed proportional integral (PI) loop. Specifically, the variation of the PWM duty cycle may be adaptively adjusted according to the voltage information of the control circuit and the rotational speed information fed back by the electric motor, so as to reduce the steady-state error of the constant-speed control of the electric motor.

Figure 4:
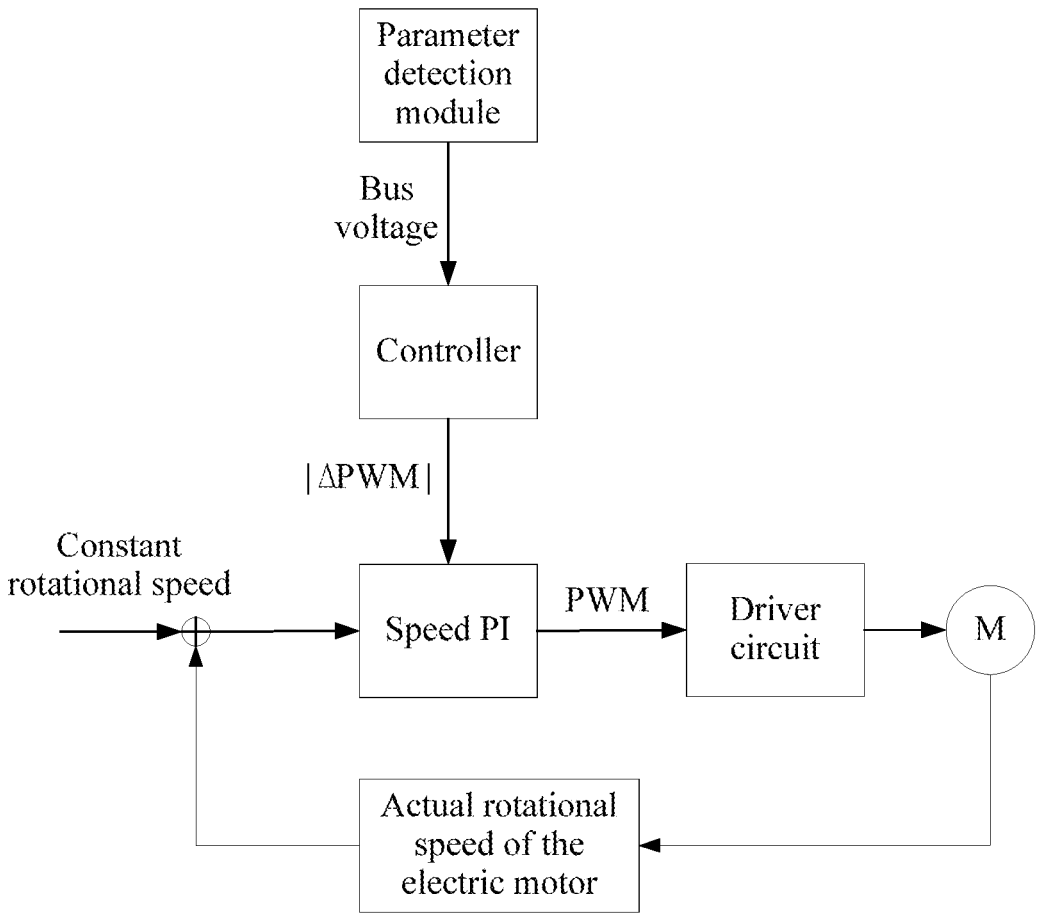
FIG. 4 is a schematic diagram of a control circuit of an electric motor according to an example of the present application.

Referring to FIG. 4, the parameter detection module 313 can detect the electrical parameter of the control circuit 31, and then the controller 314 may acquire the preceding electrical parameter and adjust the variation of the duty cycle of the PWM signal according to the magnitude of the electrical parameter. In this example, the electrical parameter may be the bus voltage or bus current of the control circuit 31. In this example, $\Delta$PWM is used for denoting the variation of the duty cycle. In an example, the controller 314 may adjust the absolute value of the variation of the duty cycle of the PWM signal, that is, $|\Delta PWM|$ according to the magnitude of the bus voltage. For example, when the bus voltage is relatively large, the controller 314 may reduce $|\Delta PWM|$, that is, reduce the amount by which the PWM duty cycle increases or decreases; and when the bus voltage is relatively small, the controller 314 may increase $|\Delta PWM|$, that is, increase the amount by which the PWM duty cycle increases or decreases. In this example, the controller 314 may include a data acquisition module for acquiring the bus voltage and a data processing module for calculating the magnitude of $|\Delta PWM|$ according to the bus voltage.

In fact, when the bus voltage is relatively large, the energy stored in the motor windings is relatively high, and the freewheeling time of the floating phase during commutation is relatively long. In this case, to maintain the constant-speed stability of the electric motor, the PWM duty cycle may need to be increased or decreased. To avoid the further increase of the freewheeling time due to too much increase or decrease of the duty cycle, the controller 314 may control the variation of the PWM duty cycle to have a relatively low amplitude, that is, set a relatively low |ΔPWM|. Conversely, when the bus voltage is relatively small, the energy stored in the motor windings is not high, and the freewheeling time of the floating phase during commutation is relatively short. In this case, to maintain the constant-speed stability of the electric motor, the PWM duty cycle may need to be increased or decreased. Moreover, even if the PWM duty cycle is increased or decreased by a large amount, the impact on the freewheeling time is not large, and the problem that inaccurate detection of the zero-crossing leads to the commutation error does not occur. To sum up, in the present application, the variation of the PWM duty cycle is controlled according to the magnitude of the bus voltage, thereby effectively maintaining the stability of the constant-speed control of the electric motor and reducing the steady-state error of the constant-speed control. In this example, the magnitude of the phase current when the electric motor 20 commutates is less than 70 A, thereby avoiding the occurrence of the current spikes compared to the relatively large output power of the power tool.

In an example, the electrical parameter of the control circuit 31 has a linear or non-linear relationship with the absolute value of the variation of the PWM duty cycle. In an example, the bus voltage is inversely proportional to |ΔPWM|, that is to say, the larger the bus voltage, the smaller |ΔPWM| set by the controller 314, and vice versa. For example, the bus voltage is $U_d$, and then $U_d^*|ΔPWM|=K$, where K is a constant, and the value of K varies in different working conditions.

In this example, since the relative relationship between the bus voltage and |ΔPWM| is generally set unchanged in the same working condition or in the same tool, there is no need for a criterion for determining the level of the bus voltage. Based on the determination of the relative relationship between the bus voltage and |ΔPWM|, a corresponding set value of |ΔPWM| may be obtained regardless of whether the bus voltage is determined to be high or low.

In this example, the steady-state error of the electric motor running in a constant speed may be made less than or equal to 1.5%, for example, 1.3%, by reasonably adjusting the magnitude of |ΔPWM|.

Figures 5, 6:
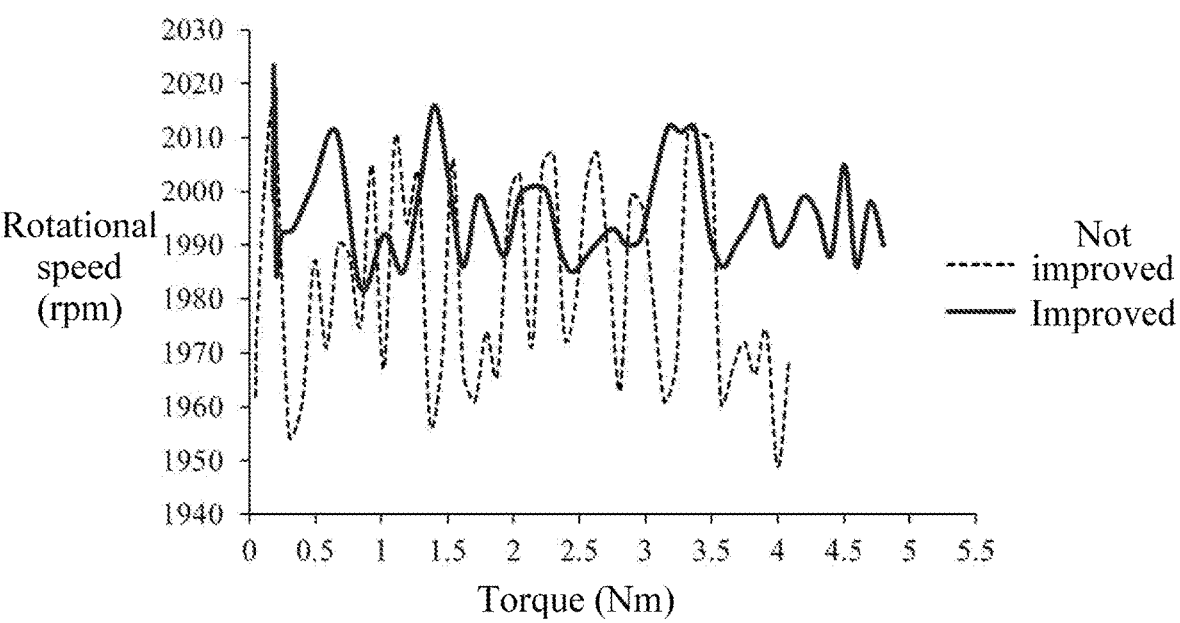
FIG. 5 is a schematic diagram of a steady-state error test comparison of an electric motor running in a constant speed before and after improvement according to an example of the present application.
FIG. 6 is a flowchart of a method for controlling a power tool according to an example of the present application.

Referring to FIG. 5, the comparison of the change process of the rotational speed of the electric motor before and after the method for adjusting the PWM duty cycle protected by the examples of the present application is adopted is made. It can be seen that although a certain steady-state error of the constant-speed control of the electric motor before and after improvement exists, the steady-state error after improvement is better than the steady-state error before improvement. In this example, the steady-state error after improvement is about 1.3%. The improvement refers to adopting the method for adjusting |ΔPWM| protected by the present application to change the PWM duty cycle to control the electric motor to operate.

Referring to FIG. 6, a process of controlling a power tool may include the steps described below.

In S101, the bus voltage of a control circuit is detected.

In S102, the amplitude of the variation of the PWM duty cycle is set according to the relationship between the bus voltage and the absolute value of the variation of the PWM duty cycle.

The magnitude of the variation of the PWM duty cycle may be understood as the absolute value of the variation of the PWM duty cycle, that is, |ΔPWM|.

The basic principles, main features, and advantages of this application are shown and described above. It is to be understood by those skilled in the art that the aforementioned examples do not limit the present application in any form, and all technical solutions obtained through equivalent substitutions or equivalent transformations fall within the scope of the present application.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

I claim:

1. A power tool, comprising:
an electric motor comprising multi-phase windings; and
a control circuit for controlling the electric motor to rotate;
wherein the control circuit comprises:
a driver circuit comprising a plurality of switching elements having a plurality of driving states to drive the electric motor to rotate;
a parameter detection module for detecting an electrical parameter of the control circuit; and
a controller for outputting a pulse-width modulation (PWM) control signal to control the driver circuit to change the plurality of driving states;
wherein the controller is configured to change an absolute value of a variation of a duty cycle of the PWM control signal according to the electrical parameter to control a steady-state error of the electric motor running in a constant speed to be within a preset range; and
wherein an average inductance of each phase winding is greater than or equal to 0.9 mH.

2. The power tool of claim 1, wherein the electrical parameter comprises a bus voltage of the control circuit.

3. The power tool of claim 1, wherein output power of the power tool is greater than or equal to 400 W.

4. The power tool of claim 1, wherein the electric motor is a sensorless electric motor.

5. The power tool of claim 1, wherein the control circuit further comprises a filter capacitor and a capacitance of the filter capacitor is less than or equal to 20 μF.

6. The power tool of claim 1, wherein the electrical parameter has a linear or non-linear relationship with the absolute value of the variation of the duty cycle.

7. The power tool of claim 1, wherein the electrical parameter is inversely proportional to the absolute value of the variation of the duty cycle.

8. The power tool of claim 1, wherein the electric motor is a brushless direct current (BLDC) motor.

9. The power tool of claim 1, wherein the power tool is one of a wall grinding machine, an electric hammer, an angle grinder, or an electric wrench.

10. The power tool of claim 9, wherein the power tool is a wall grinding machine comprising a tool body including a working head, an operating rod, the electric motor mounted in the working head, and a control device accommodating the controller.

11. The power tool of claim 10, wherein the control device is disposed in the tool body or is independent of the tool body.

12. The power tool of claim 1, wherein the steady-state error of the electric motor running in a constant speed is less than or equal to 1.5%.

13. A power tool, comprising:
an electric motor comprising multi-phase windings; and a control circuit for controlling the electric motor to rotate, wherein the control circuit comprises:

a driver circuit comprising a plurality of switching elements having a plurality of driving states to drive the electric motor to rotate;

a parameter detection module for detecting an electrical parameter of the control circuit; and a controller for outputting a pulse-width modulation (PWM) control signal to control the driver circuit to change the plurality of driving states;

wherein the controller is configured to change a magnitude of a variation of a duty cycle of the PWM control signal according to the electrical parameter to control a phase current magnitude when the electric motor commutates to be less than 70 A; and wherein an average inductance of each phase winding is greater than or equal to 0.9 mH.

14. The power tool of claim 13, wherein the electrical parameter is inversely proportional to an absolute value of the variation of the duty cycle.

15. The power tool of claim 13, wherein the electrical parameter comprises a bus voltage of the control circuit.

16. The power tool of claim 13, wherein output power of the power tool is greater than or equal to 400 W.

17. The power tool of claim 13, wherein the electric motor is a sensorless electric motor.

18. A power tool, comprising:

an electric motor comprising multi-phase windings; and a control circuit for controlling the electric motor to rotate;

wherein the control circuit comprises:

a driver circuit comprising a plurality of switching elements having a plurality of driving states to drive the electric motor to rotate;

a parameter detection module for detecting an electrical parameter of the control circuit; and a controller for outputting a pulse-width modulation (PWM) control signal to control the driver circuit to change the plurality of driving states;

wherein the controller is configured to change an absolute value of a variation of a duty cycle of the PWM control signal according to the electrical parameter to control a steady-state error of the electric motor running in a constant speed to be within a preset range; and wherein the control circuit further comprises a filter capacitor and a capacitance of the filter capacitor is less than or equal to 20 μF.

\* \* \* \* \*